UNITED STATES PATENT OFFICE 2,352,964

PROCESS OF MANUFACTURING SALTS OF STYPHNIC ACID

Joseph D. McNutt, New Haven, Conn., and Samuel D. Ehrlich, Tamaqua, Pa., assignors to Western Cartridge Company, New Haven, Conn., a corporation of Delaware No Drawing. Application November 8, 1941, Serial No. 418,286

7 Claims. (Cl. 260—435)

This invention relates to a method of manufacturing a new explosive compound and more particularly to a method of preparing complex lead salts of styphnic acid and hypophosphorous acid and is a continuation in part of our copending application Serial No. 282,518, filed July 1, 1939 (now Patent No. 2,292,956, granted August 11, 1942).

As hereinafter disclosed we have found that lead hypophosphite and lead styphnate may be caused to react to form a double salt containing 2 mols. of normal lead styphnate and 1 mol. of lead hypophosphite, or by varying the conditions of reaction and the quantity of reacting materials we may also prepare a complex salt containing 1 mol. each of lead styphnate, basic lead styphnate and lead hypophosphite.

Such salts are capable of use in priming mixtures for small arms ammunition, in commercial detonators, in high explosives shells and in other uses where any of the present known high explosives are used. The complex salts of lead styphnate and lead hypophosphite possess certain advantages for these purposes over many of the compounds now employed.

Lead styphnate and basic lead styphnate are known detonators and are employed in priming mixtures as initiators in place of mercury fulminate. Lead hypophosphite has also been employed in priming mixtures to lower the decomposition point of priming mixtures containing difficultly decomposable oxidizers. The use of lead hypophosphite in priming mixtures is described and claimed in United States Letters patent to Joseph D. McNutt, No. 2,136,801, granted November 15, 1938.

We have found that certain improved results can be obtained in priming mixtures and in other analogous uses when complex salts of lead styphnate and lead hypophosphite are employed as an ingredient. These compounds are produced from styphnic acid, sodium hydroxide, lead hypophosphite and lead nitrate. By controlling the reaction, a compound may be produced containing two mols. of normal lead styphnate and one mol. of lead hypophosphite corresponding to the chemical formula:

$$2C_6H(NO_2)_3O_2Pb \cdot Pb(H_2PO_2)_2 \cdot 2H_2O$$

Crystals of this double salt are in the form of very thin hexagonal plates. Priming mixtures in which this double salt is employed are more sensitive to friction and have lower instantaneous flash point than priming mixtures containing a mechanical mixture of normal lead styphnate and lead hypophosphite. The double salt of normal lead styphnate and lead hypophosphite may be prepared as follows:

| | | |
|---|---|---:|
| TNR | grs | 10 |
| Adulterant | gr | 0.05 |
| Lead nitrate | grs (theoretical) | 13.5 |
| Sodium hydroxide | cc. (10 N.) | 8.2 |
| Water | cc | 140 |
| Lead hypophosphite | grs | 10 |

In forming the double salt, the trinitroresorcinate, adulterant and lead nitrate are stirred with the water at a temperature of approximately 73° C. As adulterants we employ the nitro derivatives of resorufin, the nitro derivatives of indophenol and the nitro derivatives of resazurin. Salts of these compounds may also be used, such as the lead salt of nitroresorufin. Mixtures of the above materials may also be used. When carrying out a reaction with the above quantities of materials, 3 grams of lead hypophosphite are then added together with all of the sodium hydroxide. This results in the formation of a temporary gel consisting of amorphous flocs and some needles. This gel breaks very quickly and normal lead styphnate is precipitated. After seven or eight minutes the remainder of the lead hypophosphite is added. The hexagonal plates of the double salt of normal lead styphnate and lead hypophosphite begin to form about fifteen to twenty-five minutes after the addition of the remainder of the lead hypophosphite and the reaction is complete in about one and a half hours. The crystals settle quickly and the mother liquor is decanted hot. The product is then washed with cold water a number of times. We have found that six washings are generally satisfactory. From the above quantities of reacting materials a yield of 22.5 grams of the double salt is obtained. The product is chiefly in the form of plates with a few rods. It has an instantaneous flash point of 240° C. and a density of 3.34.

By varying the reacting conditions and the quantities of the reacting materials we may also prepare a complex salt containing one mol. each of lead styphnate, basic lead styphnate and lead hypophosphite. This triple salt also is useful as an initiator and as a substitute for known high explosives. It also possesses the advantage of greater sensitivity to friction and lower flash point than materials now used for these purposes. This compound may be prepared by employing the reacting materials heretofore enumerated in the quantities stated, except that 11 cc. of sodium hydroxide is employed. The yield is increased, however, if the theoretical amount of lead nitrate (20.3 gr.) necessary for this reaction is employed. The triple salt crystallizes in the form of rods or parallelograms having a specific gravity of 3.73 and an instantaneous flash point of 218° C. It corresponds to the chemical formula:

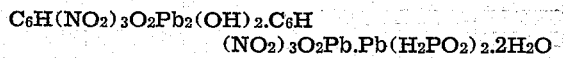

$C_6H(NO_2)_3O_2Pb_2(OH)_2.C_6H(NO_2)_3O_2Pb.Pb(H_2PO_2)_2.2H_2O$

While the methods of preparing the compounds set forth above are particularly advantageous in that they produce more uniform products, either the double salt of lead styphnate and lead hypophosphite or the triple salt containing one mol. each of lead styphnate, basic lead styphnate and lead hypophosphite may be prepared by other methods. For example, the double salt may be prepared from lead styphnate and lead hypophosphite by heating them in water to a temperature of 70° C. or it may be prepared by a reaction of sodium hypophosphite, lead nitrate and lead styphnate. Likewise the complex basic salt may be prepared by heating basic lead styphnate, lead styphnate and lead hypophosphite in water. While the addition of the nitro derivatives of resorufin, the nitro derivatives of indophenol and the nitro derivatives of resazurin, or the salts of one of these compounds is the preferred practice, either the double salt or the complex basic salt may be prepared without the use of these adulterants.

As stated, the new explosives may be employed in various uses in lieu of the explosives now used. They are particularly useful in the preparation of priming mixtures for small arms ammunition. Priming mixtures containing these complex salts and other conventional ingredients of priming mixtures are more sensitive and have lower flash points than similar mixtures prepared with other initiators.

The following typical formulae may be employed in rim fire, center fire and shot shell priming mixtures:

*Rimfire*

|  | Percent | Preferred, percent |
| --- | --- | --- |
| Triple salt | 30-60 | 50 |
| Lead nitrate | 15-40 | 30 |
| Glass | 10-30 | 20 |

*Centerfire*

|  | Percent | Preferred, percent |
| --- | --- | --- |
| Triple salt | 20-50 | 35 |
| Lead nitrate | 30-60 | 40 |
| Antimony sulphide | 20-40 | 18 |
| Calcium silicide | 5-20 | 7 |

*Shotshell*

|  | Percent | Preferred, percent |
| --- | --- | --- |
| Triple salt | 15-40 | 20 |
| Barium nitrate | 20-60 | 35 |
| Fulminate mercury | 15-40 | 25 |
| Antimony sulphide | 10-25 | 15 |
| Calcium silicide | 0-15 | 5 |

The above formulae are given by way of example and other well known priming mixture ingredients may be substituted for the various oxidizers and fuels to obtain varying results necessary under different conditions. Other explosives, such as diazodinitrophenol, normal lead styphnate or basic lead styphnate may be used for part of the double salt. Also other oxidizers, such as barium-potassium nitrate or lead peroxide may be substituted for the oxidizers in the formulae given without departing from the spirit of the invention.

In preparing priming mixtures the ingredients are first thoroughly and uniformly mixed according to practice well known to those skilled in the art and then formed into individual pellets of the proper size for individual charges in the customary manner. This is generally done by the use of charge plates provided with perforations to mold pellets of the proper size and weight. These pellets are then transferred either into priming cups for shot shell cartridges or for center fire ammunition or into empty rim fire cartridge shells in the usual way. In connection with rim fire ammunition, the charge is forced to distribute itself in the hollow rim by spinning each shell in the customary rim fire loading machines. After the shells have been properly primed, they are loaded with powder and shot or bullets in the usual manner.

When employed as a detonator, the complex salts of lead styphnate and lead hypophosphite is loaded under suitable pressure in the usual detonator casing, caps or tubes and employed to detonate high explosives in the same manner that the known initiators or detonators are employed. It may be used to detonate any type of high explosive, such as dynamite, tetryl, trinitrotoluol and other known high explosives.

We claim:

1. The herein described process which comprises forming an aqueous solution containing basic lead styphnate, normal lead styphnate and lead hypophosphite and causing the materials in solution to react to form a complex salt containing 1 mol. each of basic lead styphnate, normal lead styphnate and lead hypophosphite.

2. The herein described process which comprises forming an aqueous solution containing basic lead styphnate, normal lead styphnate and lead hypophosphite and heating the solution to produce a complex salt containing 1 mol. each of basic lead styphnate, normal lead styphnate and lead hypophosphite.

3. The herein described process which comprises preparing a solution of styphnic acid and lead nitrate, adding a solution of lead hypophosphite and sodium hydroxide thereto whereby a temporary gel is formed, and thereafter adding additional lead hypophosphite thereto to form a complex lead salt consisting of 2 mols. of lead salts of styphnic acid and 1 mol. of lead hypophosphite.

4. The herein described process which comprises placing basic lead styphnate, lead styphnate, lead hypophosphite and an adulterant selected from the group consisting of the nitro derivatives of resorufin, the nitro derivatives of indophenol, the nitro derivatives of resazurin, and salts of these compounds in aqueous solution, and causing the basic lead styphnate, normal lead styphnate and lead hypophosphite to react to form a complex salt containing 1 mol. each of basic lead styphnate, normal lead styphnate and lead hypophosphite.

5. The herein described process which comprises preparing an aqueous solution containing styphnic acid, lead nitrate and an adulterant selected from the group consisting of the nitro derivatives of resorufin, the nitro derivatives of indophenol, the nitro derivatives of resazurin, and salts of these compounds, adding a solution containing lead hypophosphite and sodium hydroxide thereto whereby a temporary gel is formed, and thereafter adding additional lead hypophosphite thereto to form a complex lead salt consisting of 2 mols. of lead salts of styphnic acid and 1 mol. of lead hypophosphite.

6. The herein described process which comprises placing lead styphnate and lead hypophosphite in an aqueous solution, and causing the materials in solution to react to form a complex salt containing 2 mols. of normal lead styphnate and 1 mol. of lead hypophosphite.

7. The process of producing a double salt of lead styphnate and lead hypophosphite which comprises forming an aqueous solution containing sodium hypophosphite, lead nitrate, sodium hydroxide and lead styphnate, and heating the solution to form a double salt containing 2 mols. of normal lead styphnate and 1 mol. of lead hypophosphite.

JOSEPH D. McNUTT.
SAMUEL D. EHRLICH.